(A) FIVE EXTRACTIONS — SIX KETTLES

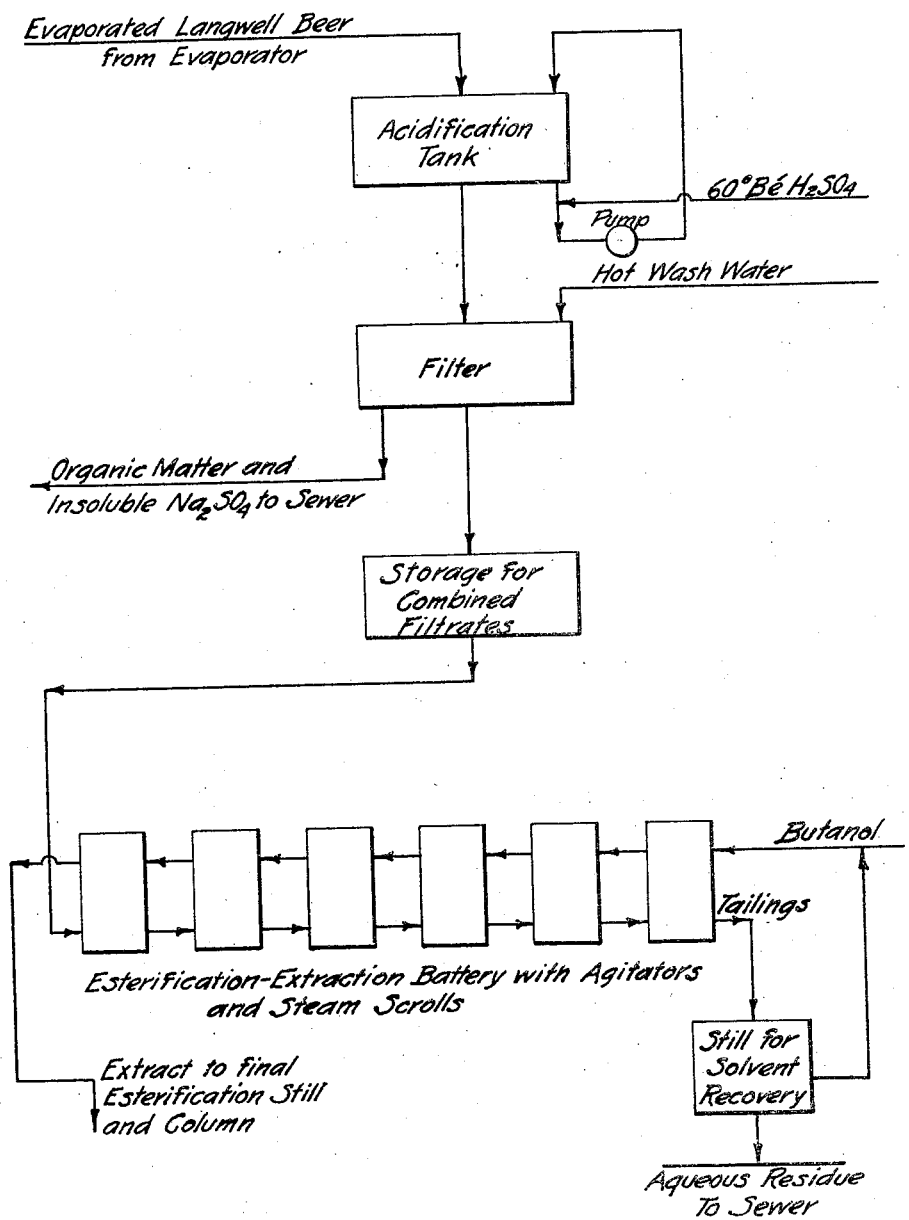
FIGURE I - FLOW DIAGRAM

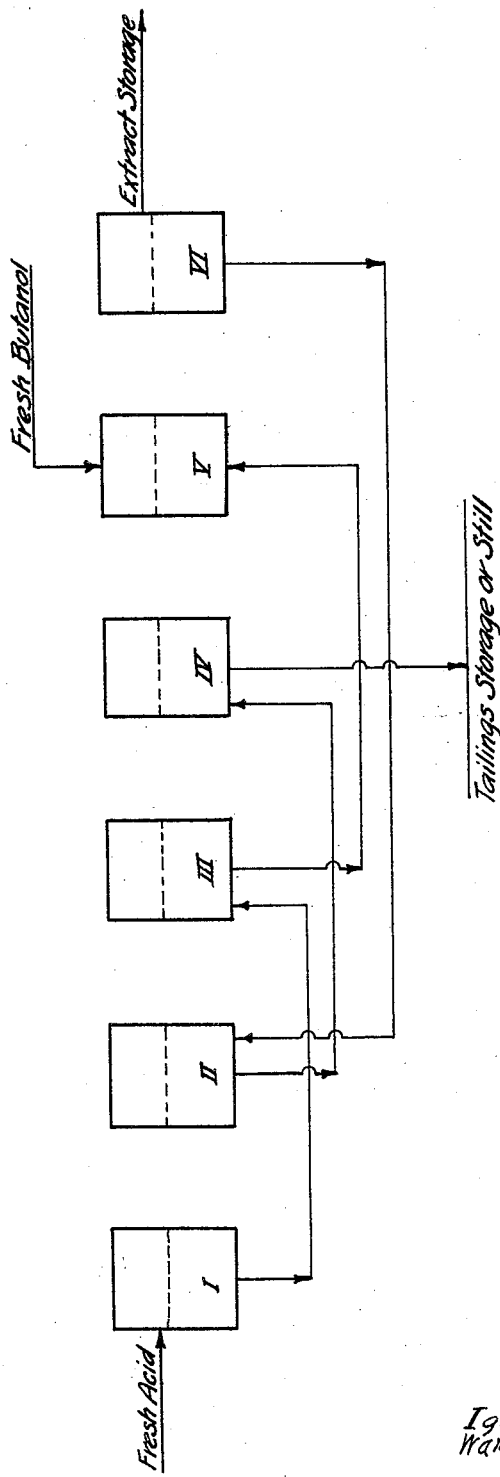
*Figure II*

1st cycle: 5 to tailings storage
    4 to 6
    3 to 5
    2 to 4
    1 to 3
    1 top to extract storage
    Butanol to 6
    Acid to 2
    Agitate: 1 is empty 2nd cycle: 6 to tailings storage
    5 to 1
    4 to 6
    3 to 5
    2 to 4
    2 top to extract storage
    Butanol to 1
    Acid to 3
    Agitate: 2 is empty 3rd cycle: 1 to tailings storage
    6 to 2
    5 to 1
    4 to 6
    3 to 5
    3 top to extract storage
    Acid to 4
    Butanol to 2
    Agitate: 3 is empty 4th cycle: 2 to tailings storage
    1 to 3
    6 to 2
    5 to 1
    4 to 6
    4 top to extract storage
    Acid to 5
    Butanol to 3
    Agitate: 4 is empty 5th cycle: 3 to tailings storage
    2 to 4
    1 to 3
    6 to 2
    5 to 1
    5 top to extract storage
    Butanol to 4
    Acid to 6
    Agitate: 5 is empty 6th cycle: 4 to tailings storage
    3 to 5
    2 to 4
    1 to 3
    6 to 2
    6 top to extract storage
    Butanol to 5
    Acid to 1
    Agitate: 6 is empty

(B) FIVE EXTRACTIONS — FIVE KETTLES

1st cycle: 5 tailings to beer still
    3 to 5
    1 to 3
    4 to 1
    2 to 4
    1 top to extract storage
    Butanol to 1
    Acid to 2
    Agitate 2nd cycle: 1 tailings to beer still
    4 to 1
    2 to 4
    5 to 2
    3 to 5
    2 top to extract storage
    Butanol to 2
    Acid to 3
    Agitate 3rd cycle: 2 tailings to beer still
    5 to 2
    3 to 5
    1 to 3
    4 to 1
    3 top to extract storage
    Butanol to 3
    Acid to 4
    Agitate 4th cycle: 3 tailings to storage
    1 to 3
    4 to 1
    2 to 4
    5 to 2
    4 top to extract storage
    Butanol to 4
    Acid to 5
    Agitate 5th cycle: 4 tailings to extract storage
    2 to 4
    5 to 2
    3 to 5
    1 to 3
    5 top to extract storage
    Butanol to 5
    Acid to 1
    Agitate Repeat

FIGURE III — TYPICAL OPERATING SCHEDULES

Ignace J. Krchma
Ward J. Bloomer  INVENTORS

BY
Francis M. Crawford  ATTORNEY

Patented May 16, 1933

1,908,708

UNITED STATES PATENT OFFICE

IGNACE J. KRCHMA, OF BALTIMORE, MARYLAND, AND WARD J. BLOOMER, OF TERRE HAUTE, INDIANA, ASSIGNORS TO COMMERCIAL SOLVENTS CORPORATION, OF TERRE HAUTE, INDIANA, A CORPORATION OF MARYLAND

RECOVERY OF ORGANIC ACIDS

Application filed November 15, 1930. Serial No. 495,856.

Our invention relates to a process for the recovery of organic acids from their corresponding salts. More particularly, our invention relates to a process for the recovery of organic acids from dilute aqueous solutions of their salts in a form suitable for direct conversion to esters.

In the past it has been the custom in obtaining organic acids from dilute aqueous solutions to neutralize these acids with an alkaline material such as calcium carbonate, evaporate to dryness the resulting salt and then treat the latter with a non-volatile mineral acid such as sulfuric acid. This method, however, has certain disadvantages which are overcome by our improved process. In the recovery of acetic acid, for example, considerable difficulty is experienced in obtaining good yields of acetic acid even when distilling under reduced pressure with concentrated sulfuric acid over extended periods of time. Among the advantages of our improved process over prior processes are: simplicity of apparatus employed, the elimination of costly drying of the aqueous salt solutions, and the fact that no vacuum distillation is required, and the effective separation and recovery of acids from aqueous mixtures thereof from which they are not always readily recoverable by previously disclosed methods.

Our process operates on a combined extraction and esterification principle and may be applied to either dilute aqueous solutions of organic acids or to solutions containing salts of organic acids. In the latter case, however, it is necessary to subject the solution to a preliminary treatment for the purpose of liberating the organic acids. In case, for example, a solution containing sodium acetate is to be treated, sufficient non-volatile mineral acid such as sulfuric or phosphoric is added to insure the complete release of the acids. It is preferable also that a slight excess of the mineral acid, say 1% or more, if necessary, be present in the solution to serve as an esterification catalyst in later steps of the process. After the release of the organic salts, the precipitated salts together with any foreign solids or organic matter are filtered off by means of an ordinary plate filter press, a rotary filter press or other suitable means. The salts are washed counter-currently with water to recover organic acids and the strongest portion of the wash water added to the filtrate. If an alkali metal salt is used as the source of the organic acid only a small amount or perhaps no precipitate of salts—depending upon the concentration of the solution—will be formed. In this case the greater portion of the salts remains in solution and is removed at a later point in the process. If an aqueous solution of an organic acid or acids per se is available as the starting material, naturally this preliminary treatment is not necessary and only about 1% of a non-volatile mineral acid or other customary esterification catalyst need be added for the solution to be ready for treatment for recovery of the organic acids.

An alcohol which is at least a partial solvent for the acid or acids to be recovered is next added to the solution and the latter heated for a short time while agitating. Chemical and physical equilibria are rapidly attained and the solution then allowed to stand until it stratifies. During this operation a portion of the organic acid in the aqueous layer is extracted by the alcohol with which it has been agitated. At the same time a portion of the acid will be esterified by the alcohol by the aid of the small amount of mineral acid present as a catalyst, thus serving to remove still more of the organic acid from the aqueous layer. On allowing the mixture to settle, therefore, there is obtained an upper layer consisting of alcohol, ester, organic acid and some water dissolved therein and a lower aqueous layer containing the unextracted organic acid, small amounts of alcohol and ester, if water soluble, and a metal salt, as for example, sodium sulfate, if the original aqueous solution contained sodium acetate instead of acetic acid. The upper solvent layer may then be drawn off and the aqueous layer subjected to a similar treatment with either fresh alcohol or an alcohol-ester mixture from a preceding operation of such character and composition as not to be in chemical and physical equilibria with the aqueous acid layer. This operation may then be continued for a number of times, preferably but not necessarily operating on the counter-current principle, until the organic acid has been completely or substantially completely removed from the aqueous layer.

Our process is applicable to the recovery of monobasic aliphatic acids above formic, and for their recovery any alcohol may be used which is not substantially soluble in water and whose ester formed from the acid being recovered is not substantially soluble in water. The process is also applicable to the recovery of mixed acids so long as requirements such as those just enumerated are met. Aqueous solutions containing acids in concentrations ranging from a few grams per 100 c. c. up to 30 grams per 100 c. c. or better are suitable for treatment by our process. For most purposes, however, a concentration of about 20 grams per 100 c. c. of solution is preferred.

The specific example cited below will serve to illustrate a preferred method of carrying out our process. It is distinctly understood, however, that the operating technique may be varied somewhat in a number of ways and that we intend to claim such customary variations as would ordinarily occur to one skilled in the art as falling within the concept of our invention.

In the so-called Langwell process, acetic acid together with some butyric and propionic acids is produced by the fermentation of cellulosic materials by the aid of thermophilic bacteria. During the course of the fermentation it is necessary to regulate the degree of acidity of the fermenting medium in order to obtain optimal results, and hence the acids are neutralized as formed by the addition of some alkaline material such as soda ash, calcium carbonate, ammonia, etc. When the fermentation is complete, therefore, the mash contains salts of acetic, butyric and propionic acids together with small amounts of the free acids, unfermented cellulosic matter, lignin, etc. After the removal of as much of the solid matter as possible from the fermented mash, the residual liquor is concentrated by evaporation until it contains preferably about 45–50% total solids, about 70% of which are the salts of the volatile acids and 30% organic matter.

To the product of approximately the above concentration is next added sulfuric acid in about 1%, or higher if necessary, excess of that theoretically required to liberate the acetic and butyric acids from their corresponding sodium salts. In a composition of the character indicated a portion of the sodium sulfate will be crystallized out and is preferably removed, together with organic insolubles, by filtration or other suitable method, the filter cake being washed with water which is added to the original filtrate. If only a small amount of salt is precipitated it need not be removed from the acid liquor. Its removal at this point, however, obviates any danger of the extraction-esterification apparatus, in later steps of the operation, becoming clogged up. It is desirable to carry out this step of the process in such a manner as to give an acid liquor which does not vary appreciably in composition between succeeding operations.

Figure I shows a flow sheet illustrating the application of my process to the recovery of acids produced in the Langwell fermentation process. A specific example will illustrate the operation of the process on a plant scale. Beer produced in the Langwell fermentation process is first evaporated by any suitable means and conveyed to the acidification tank. The following analysis gives the composition of a product suitable for treatment at this point: mixed salts 37% (sodium acetate, sodium butyrate and sodium propionate), organic matter 15%, water 48%.

Sulfuric acid (60° Bé.) is next added to the concentrated liquor in the acidification tank in sufficient quantity to liberate the acetic, butyric and propionic acids, and preferably leave a slight excess of sulfuric acid. The sulfuric acid may be added in any suitable way, one method being to circulate by means of a pump the liquor being treated and introduce the sulfuric acid in small quantities into this circulating liquid.

When the acidification has been completed the liquor is filtered to remove organic matter and the precipitated portions of the sodium sulfate. After washing the filter cake with hot water the cake may be treated to recover sodium sulfate and other useful constituents, or discarded. The filtrate and combined wash water is passed to a storage tank and is ready for use in the later step of the process. The composition of the liquor entering the filter obtained from the Langwell liquor mentioned above is approximately as follows: mixed acids 17% (acetic, butyric and propionic), free $H_2SO_4$ 2%, sodium sulfate varying proportions, organic matter in solution varying proportions, specific gravity 1.12.

The next step of the operation may be carried out in a system such as that illustrated by the battery of esterification-extraction vessels, 1–6 inclusive in Figure I. The number of these vessels used in a particular system depends upon the acid or acids being recovered, the concentration of the acid liquor, the extraction agent, the method of conducting the counter-current extraction, etc. Usually, however, a system consisting of from 5 to 6 extraction vessels gives satisfactory results. These vessels may be constructed similarly to ordinary esterification kettles, and provided with steam scrolls, means for agitating the liquid being treated, inlet and outlet connections, sight glasses for measuring the height of the liquid layers in the vessels, manholes to facilitate cleaning, etc. A condenser is also provided on each extraction vessel to reflux vaporized solvent and return it to the kettle. This arrangement serves to maintain atmospheric pressure within the kettle and thus obviates the necessity of heavy construction to withstand pressure of the vapors.

In operating our process we may add acid liquor of the composition indicated above and an alcohol such as butanol, in the proportions of 60 gallons of the former to 30 gallons of the latter, to a vessel of 100 gallons capacity. The mixture is heated by means of steam coils to a temperature between 75° C. and the boiling temperature, agitated for about 15 minutes, allowed to settle and the upper and lower liquid layers transferred to different vessels where they each come in contact with liquids differing in composition from that from which they were separated in the preceding vessel. Assuming that the system is in operation and has reached equilibrium, the following description will illustrate one method of operation. The exit valve from vessel No. 6 is opened and the extracted tailings allowed to pass out until a sight glass indicates that only the solvent layer remains. If the solvent employed is substantially water-soluble, the tailings are sent to a still for the recovery of solvent material which is returned to the process. Similarly, the solvent layer may be removed from vessel No. 1 until only the acid layer remains. The butanol layer may then be transferred from No. 2 to No. 1, from No. 3 to No. 2, . . ., and finally from No. 6 to No. 5. The acid liquor layer in No. 5 is then transferred to No. 6, that from No. 4 to No. 5 and so on until when the shift is completed, vessel No. 1 contains just the butanol layer from No. 2, and vessel No. 6 contains the acid liquor layer from vessel No. 5. To vessel No. 1 is then added 60 gallons of fresh acid liquor and to vessel No. 6 is added 30 gallons of fresh butanol or other extractant. The layers of acid liquor and butanol in the intermediate vessels and which have been subjected to previous treatment one or more times are next transferred to the next respective vessel in the series. The mixtures in the different vessels are then again agitated, allowed to settle and transferred as before, the same operation being continued indefinitely. The temperature at which the operation is carried out naturally varies somewhat depending upon the particular set of operating conditions. When the butanol, for example, is used as the extractant to recover acetic, butyric and propionic acids, it is preferred to carry out the operation at temperatures ranging from about 80°–92° C.

When using the system of countercurrent esterification-extraction described above, five vessels are generally suitable. This procedure, however, requires the transfer of both layers of liquid after each treatment. According to a somewhat different procedure which will now be described a number of operating difficulties inherent in the preceding system are overcome, and it is only necessary to transfer at the end of each operation one of the two layers of liquids. One additional reaction vessel may be required, however, when operating in this manner. It should be noted that in carrying out a cycle of operations such as that described herein it is possible to employ a schedule in which an odd number of extractions is made with the same number of vessels, but not an even number. That is, five extractions can be made with five vessels, but six extractions cannot readily be made with six vessels.

Assuming, as in the previous case, that the system has been operating a sufficient length of time to reach equilibrium, the method of operation may best be understood by referring to Figure II. The acid liquor in the lower part of vessel No. 4 has been extracted five times and is transferred to the beer still for the recovery of the water-soluble solvent. The lower acid liquor layer in vessel No. 3, which has been extracted four times, is now transferred for its fifth and last treatment to vessel No. 5, which was empty during the preceding cycle of operations. To this vessel is also added 30 gallons of fresh butanol, which performs its first extraction. The lower acid liquor layer of vessel No. 2, which has been treated twice, is now transferred to vessel No. 4 for its fourth extraction with a butanol layer which performs its second extraction operation. The acid liquor in vessel No. 1 has been extracted twice and is now transferred to vessel No. 3 for its third treatment with a butanol layer which performs its third extraction operation. The acid liquor in vessel No. 6 which has been extracted once is transferred to vessel No. 2 for its second extraction with extract which performs its fourth extraction operation. To vessel No. 1 is then added 60 gallons of fresh acid liquor which is extracted the first time with butanol which is performing its fifth extraction operation. The butanol layer remaining in vessel No. 6, after the transfer of the acid layer to vessel No. 2, is removed from the system to be treated as hereafter described and vessel No. 6 remains empty during the succeeding operation.

The flow sheets shown in Figure III will illustrate: (a) a complete cycle of operations using six reaction vessels, one of which is empty during each step of the cycle, and (b) a complete cycle of operations using five reaction vessels. As will readily be seen from a study of the diagrams, the system shown in Figure III (a) really consists of two separate units, kettles Nos. I, III and V constituting one unit, and kettles Nos. II, IV and VI, the other. In each case an extractant such as butanol is charged into a reaction vessel and remains there until it has been used five times as an extracting agent.

An operating schedule for a five kettle system is shown in diagram III (b). Assuming that the vessels are all full and each contain a top and bottom layer of liquid and that the lower layer of #5 is tailings and the upper layer of #1 is finished extract, the following description will illustrate the method of operating such a system. The lower layer of #5 is withdrawn and sent to a beer still as previously indicated. The lower layer of #3 is then transferred to #5. The lower layer of #1 is introduced into #3. The upper layer of #1 is then removed and sent to the esterification still. The lower layer of #4 is then transferred to #1 and the lower layer of #2 to #4. This leaves an upper layer lacking in #1 and a lower layer lacking in #2. Fresh extractant such as butanol is then introduced into #1 while fresh acid solution is put into #2. This leaves the system as described in the beginning except that now #1 does the work of #5 in the previous cycle, #5 the work of #4, etc., down the line. It is possible in this manner to use this system with any odd number of vessels above one, as for example, with 3, 5, 7, 9, or 11, etc. In this way none of the vessels ever stand empty and better efficiency is possible with any given number of vessels.

The operating procedure may be varied somewhat in still another manner which has certain advantages over the procedures previously described. In the first procedure described above using six reaction vessels, it was stated that after the tailings have been removed from vessel #6, all of the lower layers are advanced by one vessel, that is #6 goes to the beer still, #5 to #6, #4 to #5, etc. After this is done the upper layers are transferred in the opposite directions. Fresh extractant such as butanol is then introduced into #6 and fresh acid solution in #1. The system is then refluxed, after which the cycle is ready for repetition. A decided improvement in the process is obtained if a second refluxing is carried out between the transfer of the upper and lower layers. This operating procedure may be illustrated as follows:

1a—Refluxing
2a—Transfer of lower layer to right
3a—Refluxing vessels Nos. 2, 3, 4, 5, and 6 (#1 cannot be refluxed as it contains only top layer)
4a—Transfer of upper layer to left
5a—Introducing new solutions into #1 and #6
1b—Refluxing again.

By following out the procedure just outlined each lower layer would be progressively brought to equilibrium nine times with upper layer of new composition instead of only five times as is done by the other methods previously described. Since by this method of procedure the extraction would go by smaller increments, resulting in appreciably better efficiency, a more dilute acid solution could be treated in a given operation without sacrificing yield. By following this mode of procedure, for example, approximately the same results can be obtained with a solution containing 14 grams of acetic acid per 100 c. c. of solution as are possible with an acid solution containing 18 grams per 100 c. c. when employing the procedures previously described, although the mechanism of the operation is somewhat more difficult.

At the conclusion of the above-described operation the extracted liquor layer consisting of approximately 40 gallons, has approximately the following composition:

Gms./100 c.c.

| | |
|---|---|
| Acetic and butyric acids | 0.9 |
| Butanol | 4.0 |
| Sulfuric acid | 6.8 |
| Sodium sulfate | 20.0 |

The butanol may be recovered by distillation and returned to the system. The sodium sulfate may be recovered by crystallization or by other suitable means.

The solvent extractant layer, consisting of approximately 50 gallons, has approximately the following composition:

Per cent

| | |
|---|---|
| Free acetic and butyric acids | 11 |
| Butyl acetate and butyl butyrate | 31 |
| Butanol | 33 |
| Water | 20 |
| Organic matter | 5 |

The extract obtained as above described is preferably next transferred to an ordinary esterifiction kettle where it is refluxed a sufficient number of times to complete the esterification of the free acids to the corresponding butyl esters, the small amount of sulfuric acid remaining in the material usually being sufficient to act as a catalyst. Additional catalyst may be added, however, if required. Upon the completion of the esterification the excess butanol, the butyl acetate and the butyl butyrate may be separated and recovered by fractional distillation.

In operating our new process for the recovery of acids we may employ as the extracting agent any water-insoluble or substantially water-insoluble alcohol, as for example, butyl alcohol, amyl alcohol, isoamyl alcohol, hexyl alcohol, benzyl alcohol, etc. It may be applied to the recovery of acids which are soluble in and esterify with such alcohols, as for example, acetic, propionic, butyric, lactic, etc., acids or mixtures thereof. Naturally, in recovering different acids or mixtures thereof and in using different alcohols for recovering said acids it will be necessary to modify somewhat the specific procedure outlined above to illustrate our process. For example, with different materials and under different operating conditions it is sometimes found desirable or necessary to vary the concentration of the acids in the original acid liquor being treated, the temperature at which the extraction-esterification operation is carried out, the relative proportions of extractant and acid liquor used, the time of agitation with the extractant, the number of extractions, etc. It is distinctly understood, however, that such obvious modifications are understood as coming within the concept of our invention.

Now having described our invention, what we desire to claim is:

1. Process for the recovery of aliphatic monocarboxylic acids above formic which comprises subjecting aqueous solutions containing said acids to the countercurrent extraction-esterification action of substantially water insoluble alcohols, in the presence of an esterification catalyst.

2. Process for the recovery of aliphatic monocarboxylic acids above formic which comprises treating aqueous solutions containing salts of said acids with an amount of a mineral acid slightly in excess of the amount required to liberate said organic acids, subjecting the resulting solution to the countercurrent extraction-esterification action of alcohols which are substantially water insoluble.

3. Process for the recovery of aliphatic monocarboxylic acids above formic which comprises treating aqueous solutions containing salts of said acids with an amount of a mineral acid slightly in excess of the amount required to liberate said organic acids, removing the precipitated salts, and subjecting the resulting solution to the countercurrent extraction-esterification action of alcohols which are substantially insoluble in water.

4. In the process for the recovery of aliphatic monocarboxylic acids above formic, the step which comprises subjecting aqueous solutions containing said acids at temperatures ranging from about 75° C. to the boiling point of the mixture being treated to the countercurrent extraction-esterification action of substantially water insoluble alcohols.

5. In the process for the recovery of aliphatic monocarboxylic acids above formic, the steps which comprise treating aqueous solutions containing salts of said acids with an amount of a mineral acid slightly in excess of the amount required to liberate said organic acids, subjecting the resulting solution at temperatures ranging from about 75° C. to the boiling point of the mixture being treated to the countercurrent extraction-esterification action of alcohols which are substantially water insoluble.

6. In the process for the recovery of aliphatic monocarboxylic acids above formic, the steps which comprise treating aqueous solutions containing salts of said acids with an amount of a mineral acid slightly in excess of the amount required to liberate said organic acids, subjecting the resulting solution at temperatures ranging from about 75° C. to the boiling point of the mixture being treated, to the countercurrent extraction-esterification action of alcohols which are substantially water insoluble, and refluxing the resultant solvent layer to complete the esterification of the dissolved acids.

7. Process for the recovery of acids which comprises subjecting aqueous solutions containing acids selected from the group consisting of acetate, propionic and butyric acids to the countercurrent extraction-esterification action of an alcohol selected from the group consisting of butyl, amyl, hexyl and benzyl alcohol in the presence of an esterification catalyst.

8. Process for the recovery of aliphatic monocarboxylic acids above formic which comprises subjecting aqueous solutions containing said acids to the countercurrent extraction-esterification action of substantially water insoluble alcohols at temperatures between about 75° C. and the boiling point of the resulting acid alcohol mixture.

9. Process for the recovery of acids which comprises subjecting aqueous solutions containing acids selected from the group consisting of acetic, propionic and butyric acids to the countercurrent extraction-esterification action of an alcohol selected from the group consisting of butyl, amyl, hexyl, and benzyl alcohol at temperatures between about 75° C. and the boiling point of the resulting acid alcohol mixture.

10. Process for the recovery of aliphatic monocarboxylic acids above formic which comprises subjecting aqueous solutions containing said acids to the countercurrent extraction-esterification action of substantially water insoluble alcohols in the presence of a mineral acid.

11. Process for the recovery of acids which comprises subjecting aqueous solutions containing acids selected from the group consisting of acetic, propionic and butyric acids to the countercurrent extraction-esterification action of an alcohol selected from the group consisting of butyl, amyl, hexyl and benzyl alcohol in the presence of a mineral acid.

12. Process for the recovery of aliphatic monocarboxylic acids above formic which comprises subjecting aqueous solutions containing said acids to the countercurrent extraction-esterification action of substanially water insoluble alcohols at temperatures between about 75° C. and the boiling point of the resulting acid alcohol mixture, in the presence of an esterification catalyst.

13. Process for the recovery of acids which comprises subjecting aqueous solutions containing acids selected from the group consisting of acetic, propionic and butyric acids to the countercurrent extraction-esterification action of an alcohol selected from the group consisting of butyl, amyl, hexyl and benzyl alcohol at temperatures between about 75° C. and the boiling point of the resulting acid alcohol mixture, in the presence of an esterification catalyst.

14. Process for the recovery of aliphatic monocarboxylic acids above formic which comprises treating aqueous solutions containing salts of said acids with an amount of a mineral acid slightly in excess of the amount required to liberate said organic acids, subjecting the resulting solution to the countercurrent extraction-esterification action of substantialy water insoluble alcohols at temperatures between about 75° C. and the boiling point of the resulting acid alcohol mixture, refluxing the resulting solvent layer to complete the esterification of dissolved acids and finally separating and recovering by fractional distillation the esters thus produced.

In testimony whereof we affix our signatures.

IGNACE J. KRCHMA.
WARD J. BLOOMER.

CERTIFICATE OF CORRECTION.

Patent No. 1,908,708.  May 16, 1933.

IGNACE J. KRCHMA, ET AL.

It is hereby certified that error appears in the printed specification of the above numbered patent requiring correction as follows: Page 5, line 85, claim 7, for "acetate" read "acetic"; and that the said Letters Patent should be read with this correction therein that the same may conform to the record of the case in the Patent Office.

Signed and sealed this 15th day of August, A. D. 1933.

M. J. Moore.

(Seal)  Acting Commissioner of Patents.